United States Patent
Hatanaka et al.

(10) Patent No.: US 8,070,302 B2
(45) Date of Patent: Dec. 6, 2011

(54) LAMINATE TYPE LIGHT-EMITTING DIODE DEVICE, AND REFLECTION TYPE LIGHT-EMITTING DIODE UNIT

(75) Inventors: Mitsuyuki Hatanaka, Saitama (JP); Takashi Sato, Saitama (JP); Kazuo Yamamoto, Saitama (JP); Yukimasa Saito, Saitama (JP); Koji Uchida, Saitama (JP); Yasufumi Kawanabe, Saitama (JP)

(73) Assignee: Iwasaki Electric Co., Ltd., Tokyo (JP)

( * ) Notice: Subject to any disclaimer, the term of this patent is extended or adjusted under 35 U.S.C. 154(b) by 0 days.

(21) Appl. No.: 12/854,650

(22) Filed: Aug. 11, 2010

(65) Prior Publication Data

US 2010/0321933 A1 Dec. 23, 2010

Related U.S. Application Data

(62) Division of application No. 11/913,359, filed as application No. PCT/JP2006/309168 on May 2, 2006.

(30) Foreign Application Priority Data

May 10, 2005 (JP) .................................. 2005-137692
Aug. 8, 2005 (JP) .................................. 2005-229341

(51) Int. Cl.
G03B 21/26 (2006.01)
G03B 21/00 (2006.01)
F21V 1/00 (2006.01)

(52) U.S. Cl. .............................. 353/94; 353/31; 362/240
(58) Field of Classification Search .................... 353/94, 353/98, 99; 362/235–237, 240
See application file for complete search history.

(56) References Cited

U.S. PATENT DOCUMENTS

| | | | |
|---|---|---|---|
| 5,623,181 A * | 4/1997 | Suehiro et al. | ............... 313/512 |
| 6,414,801 B1 | 7/2002 | Roller | |
| 6,769,772 B2 | 8/2004 | Roddy et al. | |
| 2004/0207816 A1 | 10/2004 | Omoda et al. | |
| 2005/0047135 A1 | 3/2005 | Rhoads et al. | |

FOREIGN PATENT DOCUMENTS

| | | |
|---|---|---|
| EP | 1365598 A | 11/2003 |
| JP | 07-099343 | 4/1995 |
| JP | 08-076078 | 3/1996 |
| JP | 10-242524 | 9/1998 |
| JP | 2000-082846 | 3/2000 |
| JP | 2003-177353 | 6/2003 |
| JP | 2003-186110 | 7/2003 |
| JP | 2004-029770 | 1/2004 |
| JP | 2004-070017 | 3/2004 |
| JP | 2005-038831 | 2/2005 |
| JP | 2005-148298 | 6/2005 |

OTHER PUBLICATIONS

European search report mailed on Jul. 13, 2010 for the corresponding European Patent Application No. 06746018.8.
US Office Action mailed Aug. 23, 2010 for the U.S. Appl. No. 11/913,359.

* cited by examiner

*Primary Examiner* — Thanh X Luu
(74) *Attorney, Agent, or Firm* — Leason Ellis LLP

(57) ABSTRACT

A laminate type light emitting diode device having excellent heat radiation performance and high output capability is provided. A plurality of reflection type light emitting diode units 10 each of which includes a light emitting diode 2 and a dichroic mirror 3 in a hollow metal holder case 5 having high thermal conductivity so as to face each other are joined to one another through joint members 4 formed of electrical insulating material, thereby constructing the laminate type light emitting diode device 100.

13 Claims, 14 Drawing Sheets (FRONT SURFACE)   (SIDE SURFACE)   (BACK SURFACE)

(FRONT SURFACE)   (SIDE SURFACE)

(FRONT SURFACE)   (SIDE SURFACE)

P: LIGHT EMISSION DIRECTION

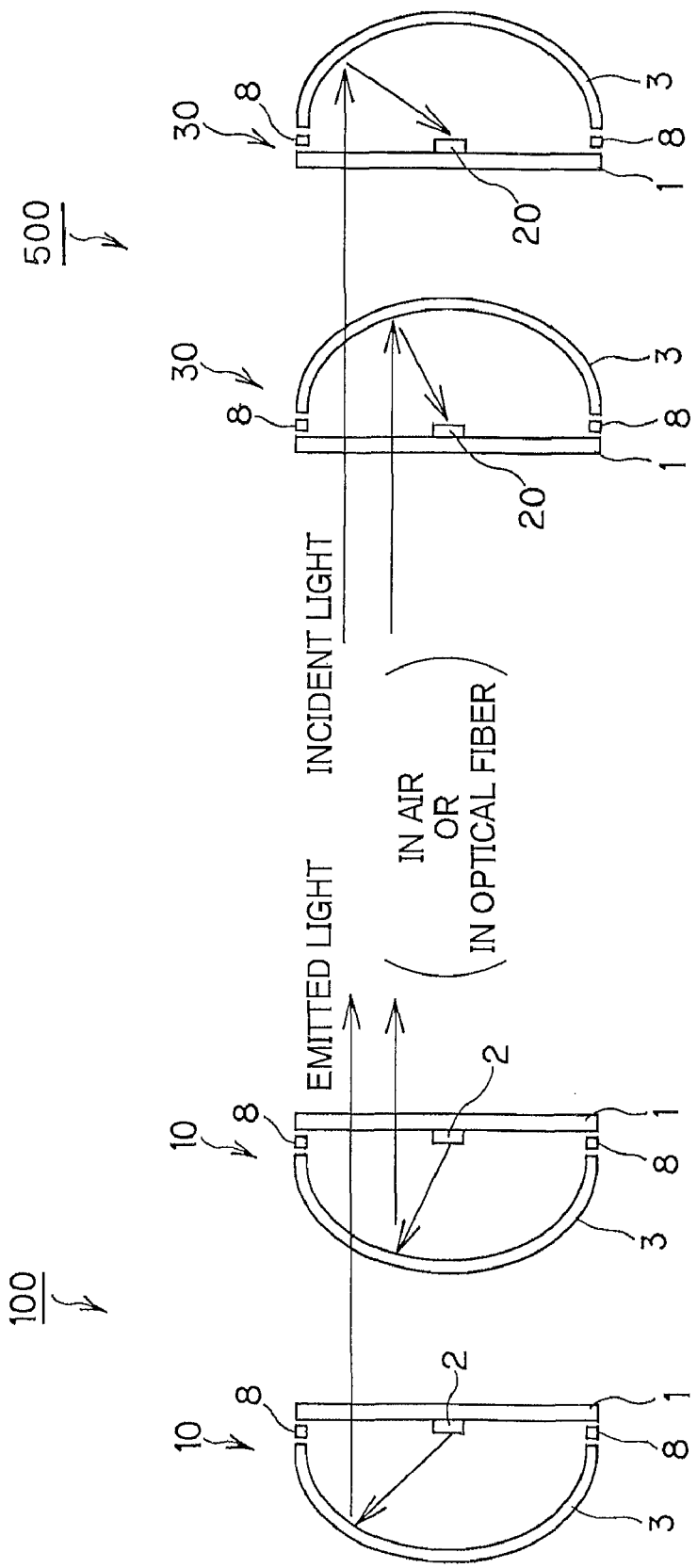

US 8,070,302 B2

LAMINATE TYPE LIGHT-EMITTING DIODE DEVICE, AND REFLECTION TYPE LIGHT-EMITTING DIODE UNIT

CROSS REFERENCE TO PRIOR APPLICATIONS

This application is a Divisional of U.S. patent application Ser. No. 11/913,359, filed Nov. 1, 2007, which is a U.S. national phase application under 35 U.S.C. §371 of International Patent Application No. PCT/JP2006/309168, filed May 2, 2006, which claims the benefit of Japanese Application No. 2005-137692, filed May 10, 2005 and Japanese Application No. 2005-229341, filed Aug. 8, 2005, all of which are incorporated by reference herein. The International Application was published in Japanese on Nov. 16, 2006 as International Publication No. WO 2006/120978 A1 under PCT Article 21(2).

TECHNICAL FIELD

The present invention relates to a projector device for projecting and displaying an image on a screen or the like, for example, and a laminate type light emitting diode device and a reflection type light emitting diode unit that are suitably used for the projector device.

BACKGROUND ART

There is known a projector device in which light emitted from a light source is modulated by using an optical modulator such as DMD (digital mirror device: registered trademark) or the like, and the modulated light is enlarged and projected onto a screen by using a projection lens. In this type projector device, a white discharge lamp such as a super-high pressure mercury lamp, a xenon lamp or the like is used as a light source (for example, see Patent Document 1). However, it is general in the projector device that images of red (R), green (G) and blue (B) corresponding to three primary colors are time-divisionally projected during one frame. When white light is used as a light source, it is necessary that a filter member for dividing the white light into three colors of R, G and B between the light source and the optical modulator, and the construction of the device is cumbersome.

Therefore, a projector device having a light source constructed by respective light emitting diodes of red, green and blue has been hitherto proposed (for example, see Patent Document 2).
Patent Document 1: JP-A-2005-148298
Patent Document 2: JP-A-2003-186110

DISCLOSURE OF THE INVENTION

Problem to be Solved by the Invention

However, in the conventional technique in which light emitting diodes of red, green and blue colors are used as light sources, a cross dichroic prism is used to combine light emitted from the respective light emitting diodes, and each light emitting diode is disposed so as to face each of three faces of this cross dichroic prism. Therefore, there is a problem that it is difficult to make the optical axes of the respective light emitting diodes coaxial with one another when the respective light emitting diodes are arranged in the projector device.

The present invention has been implemented in view of the foregoing situation, and has an object to provide a projector device in which it is unnecessary to match the optical axes of the light sources with one another, and a laminate type light emitting diode device and a reflection type light emitting diode unit that are suitably used in the projector device.

Means of Solving the Problem

In order to attain the above object, according to the present invention, a projector device having an optical modulator for modulating light emitted from a light source on the basis of image data and a projecting optical system for enlarging and projecting light modulated by the optical modulator is characterized in that the light source is constructed by using a laminate type light emitting diode device in which respective reflection type light emitting diode units of at least red light, green light and blue light are joined to one another so as to emit the light in the same direction.

Furthermore, the invention described above is further characterized in that the reflection type light emitting diode units are joined to one another through a joint member for making the optical axes thereof coaxial with one another.

Still furthermore, the invention described above is further characterized in that at least two or more of the reflection type light emitting diode units of red light, green light and blue light are turned on at the same time to project an image of color other than red, green and blue colors.

Still furthermore, the invention described above is further characterized in that a reflection type light emitting diode unit for emitting light of color other than the red light, the green light and the blue light is further joined to the laminate type light emitting diode device.

Still furthermore, the invention described above is further characterized in that each of the reflection type light emitting diode unit has a hollow holder case and a light emitting element and a dichroic mirror that are arranged so as to face each other, and light emitted from the light emitting element is reflected by the dichroic mirror and emitted from one opening of the holder case.

According to the present invention, there is provided a laminate type light emitting diode device characterized in that a plurality of reflection type light emitting diode units each comprising a light emitting element and a dichroic mirror which are arranged in a metal hollow holder case having high thermal conductivity so as to face each other are joined to one another through a joint member formed of electric insulating material.

Furthermore, the invention described above is further characterized in that the light emitting element is secured to a lead frame formed of high thermal conductive material, and the lead frame is secured to the holder case.

Still furthermore, the invention described above is further characterized in that an adjusting spacer for matching the focal position of the dichroic mirror with the arrangement position of the light emitting element is provided between the lead frame and the dichroic mirror.

Still furthermore, the invention described above is further characterized in that a diffusion filter is provided between the light emitting element and the dichroic mirror.

Still furthermore, the invention described above is further characterized in that a dielectric multilayered film having layers of a predetermined number or more is formed on the surface of a glass substrate to thereby form the dichroic mirror.

Still furthermore, the invention described above is further characterized in that the diameter of the dichroic mirror is set to 40 times or more of the size of the outer shape of the light emitting element.

Still furthermore, the invention described above is further characterized in that a light reflecting face of the dichroic mirror is designed in an aspheric shape or paraboloidal shape whose focal point corresponds to the arrangement position of the light emitting element.

Still furthermore, the invention described above is further characterized in that each of light emitting diodes of the plural reflection type light emitting diode units emits light having a different center wavelength.

In order to attain the above object, a reflection type light emitting diode unit for reflecting light of a light emitting element by a reflection mirror and emit the light to the external is characterized in that the light emitting element and the reflection mirror are arranged in a metal hollow holder case, and another reflection type light emitting diode unit is allowed to be joined to the reflection type light emitting diode unit through a joint member formed of electric insulating material.

Effect of the Invention

According to the present invention, the laminate type light emitting diode device in which the reflection type light emitting diode units of at least red light, green light and blue light are joined to one another so as to emit the respective light in the same direction is used as the light source. Therefore, when the light source is disposed in the projector device, a work of matching the optical axes of the reflection type light emitting diode units with one another is unnecessary.

BEST MODE FOR CARRYING OUT THE INVENTION

Embodiments of the present invention will be described with reference to the drawings.

First Embodiment

FIG. 1 is a schematic diagram showing the construction of a projector device 200 according to an embodiment. As shown in FIG. 1, the projector device 200 is equipped with a laminate type light emitting diode device 100 as a light source for emitting light, a two-dimensional optical modulator 110 for modulating light, a irradiating optical system 120 for guiding light emitted from the laminate type light emitting diode device 100 to the two-dimensional optical modulator 110, a projecting optical system 130 for projecting the modulated light modulated in the two-dimensional optical modulator 110, and a control device 140 for executing the control of the operation of the projector device 200.

The laminate type light emitting diode device 100 selectively emits red light (R), green light (G) and blue light (B) corresponding to the three primary colors or emits some of the red, green and blue light (containing a case where all color light is emitted) at the same time. Specifically, the laminate type light emitting diode device 100 has a reflection type light emitting diode unit 10A for emitting red light (R: wavelength of 660 nm), a reflection type light emitting diode unit 10B for emitting green light (G: wavelength of 525 nm) and a reflection type light emitting diode unit 10C for emitting blue light (B: wavelength of 470 nm), and these reflection type light emitting diode units 10A to 10C (represented by reference numeral "10" when particularly not discriminated) are laminated so as to be continuous with one another so that light is emitted in the same direction from the reflection type light emitting diode units 10A to 10C. Under the control of the control device 140, each color light is selectively emitted or some of color light beams (containing a case where all the color light beams are emitted) are emitted. The specific construction of the laminate type light emitting diode device 100 will be described in detail later.

The two-dimensional optical modulator 110 modulates light emitted from the laminate type light emitting diode device 100 on the basis of the control of the control device 140, and make this modulated light incident to the projecting optical system 130. In this embodiment, DMD is used as the two-dimensional optical modulator 110. Described in detail, DMD is constructed by two-dimensionally arranged micro-mirrors, each pixel of the micro-mirrors being in micron size. The tilt of the micro-mirrors is controlled every pixel, and the ON/OFF state is set by changing the reflection angle of reflection light based on the micro-mirror, and only light reflected in a predetermined direction is incident to the projecting optical system 130 and projected as a projection image. At this time, one pixel is assigned to one pixel of the projection image, and the control device 140 executes the ON/OFF control (angle control) of the micro-mirrors of one pixel on the basis of image data to be projected.

The irradiating optical system 120 is disposed between the laminate type light emitting diode device 100 and the two-dimensional optical modulator 110, and makes the light emitted from the laminate type light emitting diode device 100 incident to the whole surface of a reflection area of the two-dimensional optical modulator 110 so that the light amount of the incident light is uniform. Specifically, the irradiating optical system 120 is constructed by plural fly array lenses 121 for dispersing the light emitted from the laminate type light emitting diode device 100, a condenser lens 122 for condensing light passed through the fly array lenses 121, and a pair of reflection mirrors 123, 124 for guiding the light passed through the condenser lens 122 to the reflection area of the two-dimensional optical modulator 110. Any construction may be adopted as the construction of the irradiating optical system 120 insofar as it enables the light emitted from the laminate type light emitting diode to be incident to the whole surface of the reflection area of the two-dimensional optical modulator 110 so that the light amount of the incident light is uniform.

The projecting optical system 130 enlarges and projects the light modulated in the two-dimensional optical modulator 110 to a screen 400 disposed at the front side of the projector device 200, and plural condensing elements are constructed as a group lens arranged in the optical axis direction so that the projection image is prevented from being unclear due to chromatic aberration in respective color light beams of R, G, B or the like.

The control device 140 has a light emission controller 141 for controlling light emission of the laminate type light emitting diode device 100, and a two-dimensional optical modulator controller 142 for controlling the two-dimensional optical modulator 110. The light emission controller 141 outputs turn-on control signals Cm-r, Cm-g, Cm-b to the reflection type light emitting diode units 10A to 10C so as to successively turn on the reflection type light emitting diode units 10A to 10C every predetermined period.

Furthermore, the two-dimensional optical modulator controller 142 outputs a modulation control signal Cm-d to the two-dimensional optical modulator 110 on the basis of image data output from a computer 300 (which may be another electronic equipment having an image output function such as a digital video camera or the like) connected to the projector device 200 of this embodiment so as to control ON/OFF of each micro-mirror, thereby modulating light emitted from the laminate type light emitting diode device 100.

The two-dimensional optical modulator controller 142 controls the two-dimensional optical modulator 110 in synchronism with the light emission control of the light emission controller 141, and the details thereof will be described later.

As described above, according to this embodiment, the laminate type light emitting diode device 100 is used as the light source, and the construction of this laminate type light emitting diode device 100 will be described hereunder in detail.

FIG. 2 is a diagram showing the front and side surfaces of the laminate type light emitting diode device 100, and FIG. 3 is a side cross-sectional view of the laminate type light emitting diode device 100. FIG. 4 is an exploded perspective view showing the reflection type light emitting diode unit 10.

As shown in FIGS. 3 and 4, each of the reflection type light emitting diode units 10A to 10C of the laminate type light emitting diode device 100 includes a light emitting diode 2 as a light emitting semiconductor element, a lead frame 1 for supporting this light emitting diode 2, a dichroic mirror 3 as a reflection mirror disposed so as to face the light emission face 2A of the light emitting diode 2, and a joint member 4 joined to the reflection type light emitting diode unit 10 at the rear stage, and disposed in a holder case 5 which is designed in a cylindrical shape (may be a barrel-like shape having a rectangular cross section) shown in FIG. 6. The holder case 5 is formed of a metal member having high thermal conductivity such as aluminum or the like, and a radiating portion 5C having many radiating fins 7 is formed on the outer peripheral surface (outer surface) thereof.

As shown in FIG. 5, the lead frame 1 comprises an annular portion 1A, a substantially disc-shaped fixing portion 1B that is disposed at the center O of the annular portion 1A and has the light emitting diode 2 disposed on the back surface thereof, and three arm portions 1C extending from the annular portion 1A to the fixing portion 1B, and these elements are integrally formed by die-cutting a plate member having high thermal conductivity such as copper or the like, for example.

The light emitting diode 2 is fixed to the fixing portion 1B at the back side of the lead frame 1, and circuit boards 6 are provided to the arm portions 1C so that power is supplied from the external to the light emitting diode 2 through the circuit boards 6. A diffusion filter 9 is attached to the light emitting face 2A of the light emitting diode 2, and this will be described in detail later.

The lead frame 1 is inserted from the opening 5A of the back side of the holder case 5 into the holder case 5 while the light emitting diode 2 (light emitting face 2A) is disposed to face the back side thereof as shown in FIG. 4, and retained by a retaining piece 5B provided on the inner peripheral surface of the holder case 5 as shown in FIG. 3. At this time, the side peripheral surface of the annular portion 1A of the lead frame 1 is brought into close contact with the inner surface of the holder case 5, so that heat generated from the light emitting diode 2 is transmitted to the holder case 5.

As shown in FIGS. 3 and 7, the dichroic mirror 3 has a concave optical reflection face 3A for selectively reflecting only light having a specific wavelength band and passing light having other wavelength bands, and it is disposed in the holder case 5 through a spacer 8 for adjusting the focal distance so that the optical reflection face 3A faces the light emitting face 2A of the light emitting diode 2 as shown in FIG. 3. The optical reflection face 3A has a high reflection characteristic to the emission light wavelength of the light emitting diode 2 disposed so as to face the optical reflection face 3A, and is designed in the form of a paraboloidal plane (paraboloid of revolution) or aspherical plane having the focal point at the arrangement position of the light emitting diode 2. Accordingly, in each of the reflection type light emitting units 10A to 10C, light emitted from the light emitting diode 2 is reflected as light which is substantially parallel to the center axis N, and emitted from the opening 5D at the front side of the holder case 5 as light which is substantially parallel to the center axis N. The reflection type light emitting unit 10C located at the last stage may be provided with a normal concave mirror in place of the dichroic mirror 3 because no light is incident from the rear stage thereof.

The focal distance adjusting spacer 8 is a resin member for adjusting the focal position of the optical reflection face 3A of the dichoric mirror 3. Describing in detail, with respect to the light emitting diode 2, the height of the chip is varied in accordance with the manufacturing maker, the structure thereof (bare chip, surface mount type chip or the like) or the like, and thus the distance from the light emitting diode 2 (light emitting face 2A) to the optical reflection face 3A, that is, the focal distance f (see FIG. 3) is varied every reflection type light emitting diode unit 10, so that the light distribution characteristic or the brightness distribution is not coincident among the reflection type light emitting diode units 10.

Therefore, in this embodiment, the focal distance adjusting spacer 8 is interposed between the lead frame 1 and the dichroic mirror 3 to adjust the distance from the light emitting diode 2 (light emitting face 2A) to the optical reflection face 3A, whereby the focal position can be located at the arrangement position of the light emitting diode 2.

In this embodiment, plural cylindrical members (three members in the example shown in the figures) are used as the focal distance adjusting spacers 8, however, the present invention is not limited to this example. A cylindrical member having substantially the same diameter as the annular portion 1A of the lead frame 1 may be used as the spacer 8.

The joint member 4 is formed of electrically insulating member such as resin or the like and designed in a cylindrical shape, for example, and it is provided in the holder case 5 so that one end 4A thereof extends backwardly from the opening 5A of the back side of the holder case 5 substantially in parallel to the light emission direction P as shown in FIG. 3. One end 4B of the joint member 4 is inserted into the opening 5D at the front side of the holder case 5 of the reflection type light emitting diode unit 10 joined at the rear stage, and retained to the retaining portion 5B of the holder case 5, whereby the reflection type light emitting diode units 10 are joined to one another.

At this time, the joint member 4 extends substantially in parallel to the light emission direction P, and thus the light emission direction of the reflection type light emitting diode unit 10 joined to the rear stage through the joint member 4 concerned can be matched with that of the front stage, whereby the optical axes of the respective reflection type light emitting diode units 10A to 10C can be simply and easily matched with one another.

As described above, the plural reflection type light emitting diode units 10 are joined to one another through the joint members 4 so as to be stacked, thereby constructing the laminate type light emitting diode device 100 shown in FIGS. 2 and 3. In the laminate type light emitting diode device 100, as shown in FIG. 3, the respective reflection type light emitting diode unit 10 emit light in the same emission direction P, and the dichroic mirror 3 of each reflection type light emitting diode unit 10 transmits therethrough light from the rear stage, whereby light beams of the respective reflection type light emitting diode units 10 are combined with one another and emitted outwardly from the front side of the reflection type light emitting diode unit 10 at the front row.

Accordingly, in the laminate type light emitting diode device 100, light beams emitted from the respective reflection type light emitting diode units 10 are combined with one another and emitted to the external, and thus high optical output can be easily obtained. If red (R: wavelength of 660 nm) light, green (G: wavelength of 525 nm) and blue (B: wavelength of 470 nm) light corresponding to the primary colors of light are used by constructing the light emitting diodes 2 of the reflection type light emitting diode units 10, a full-color light source can be easily constructed by controlling light of each light emitting diode 2.

Here, as described above, in this embodiment, each of the lead frame 1 and the holder case 5 is formed of metal having high thermal conductivity such as copper or the like. Therefore, heat generated in the light emitting diode 2 can be transferred through the lead frame 1 to the holder case 5, and radiated from the radiating portion 5C of the holder case 5 concerned, so that the heat radiation of the light emitting diode 2 can be enhanced. Particularly, the radiating portion 5C having many radiating fins 7 are provided on the outer surface of the holder case 5, so that the radiation performance can be further enhanced, and thus even when a light emitting diode 2 having high output power is used, the light emitting diode 2 can be prevented from being increased in temperature when high current is supplied, so that reduction in brightness is not induced.

The heat radiation can be more enhanced by disposing an air cooling fan for air-cooling the radiating portion 5C in the neighborhood of the laminate type light emitting diode device 100.

Furthermore, by using a bare chip as the light emitting diode 2 and directly fixing the light emitting diode 2 to the lead frame 1 without interposing the insulating layer therebetween, the thermal resistance between the light emitting diode 2 and the lead frame 1 can be reduced, and the radiation performance can be further enhanced.

Specifically, in a conventional laminate type light emitting diode in which the lead frame and the light emitting diode are sealed in transparent resin, the thermal resistance of the passage extending from the light emitting diode to the ambient air is a high value of 150 to 200° C./W. On the other hand, according to this embodiment, when the diameter of the annular portion 1A of the lead frame 1 is set to 40 mm, the thickness thereof is set to 3 mm and the radiating fin 7, which is 2 mm in depth is provided on the cylindrical holder case 5, which is 20 mm or more in length, the thermal resistance extending from the joint portion (fixing portion) between the light emitting diode 2 and the lead frame 1 to the outside air can be reduced to 20° C./W or less, and further it can be reduced to 10° C./W or less by using forced air cooling in combination.

Furthermore, in the case where the lead frame 1 and the holder case 5 are formed of metal material as described above, there is a risk that electrical short-circuiting may occur between the respective units 10 when the reflection type light emitting diode units 10 are joined to one another. However, in this embodiment, the respective units 10 are joined to one another through the joint member 4 formed of electrical insulating material, and thus the electrical insulation is established between the respective units 10.

Furthermore, the cylindrical member as an embodiment of the hollow member is used as the joint member 4. Therefore, only the dichroic mirror 3 of the reflection type light emitting diode unit 10 located at the front stage of the emission direction P exists as the transparent member existing on the emission passage of light emitted from the reflection type light emitting diode unit 10 as shown in FIG. 8. That is, when light transmits through material, the travel direction of the light is refracted due to the refractivity of the material, and particularly in the case of parallel light, the parallel light component is reduced. However, according to this embodiment, by making the thickness of the dichroic mirror 3 uniform, when the parallel light a emitted from the reflection type light emitting diode 10 at the rear stage is transmitted through the dichroic mirror 3 at the front stage, a lot of the parallel light component can be made to be contained in the output light b.

Next, the dichroic mirror 3 of this embodiment will be described in detail.

In general, the dichroic mirror 3 is provided with the optical reflection face 3A having wavelength selectivity by forming dielectric multilayered film (for example, $TiO_2/SiO_2$ multilayered film) on the surface of a base material having optical transparency according to a film forming process such as deposition, sputtering, CVD (Chemical Vapor Deposition) or the like. At this time, the wavelength selectivity of the dichroic mirror 3, that is, the relationship between the wavelength and the reflectivity (transmittance) is greatly dependent on the number of the layers of the dielectric multilayered film. That is, as shown in FIG. 9, when the number of the layers of the dielectric multilayered film is small, the rising edge of the passband is moderate. As the number of the layers of the dielectric multilayered film is larger, the rising edge of the passband is sharper. Accordingly, in order to enable light incident from the rear stage to the dichroic mirror 3 with no loss (in order to reduce the reflection component), it is desired to increase the number of the layers of the dielectric multilayered film.

However, in the conventional laminate type light emitting diode device, the material of the reflection face is transmissible resin such as epoxy resin or the like, and thus the number of the layers of the dielectric multilayered film is limited to about 20 in maximum in consideration of heating in the film forming process. Therefore, it is impossible to implement the sharp rising of the passband, and thus the loss of light incident from the rear stage to the dichroic mirror 3 is large.

On the other hand, according to this embodiment, as the base material of the dichroic mirror 3 is used glass which has a higher melting point than transmissible resin and can sufficiently endure heating in the film forming process, whereby the number of the layers of the dielectric multilayered film can be increased to 30 or more which is larger than that of prior art. As a result, the dichroic mirror 3 having a sharp rising edge in passband, and the transmission loss can be suppressed.

The dichroic mirror 3 which transmits light emitted from the rear stage in the emission direction P and has the pass band having the sharp rising edge is provided to the reflection type light emitting diode unit 10 to thereby construct the laminate type light emitting diode device 100, whereby light emitted from each stage can be transmitted through the dichroic mirror(s) 3 located at the front stage(s) of the former stage in the emission direction P with no loss, and the light output can be highly efficiently implemented.

Subsequently, the relationship in size between the light emitting diode 2 and the dichroic mirror 3 will be described in detail. When the size of the light emitting diode 2 is represented by S, the diameter of the optical reflection face 3A of the dichroic mirror 3 is represented by S1 and the focal distance of the optical reflection face 3A is represented by f as shown in FIG. 11, incident light c1 which is emitted from the end of the light emitting diode 2 and incident to the optical reflection face 3A at an incident angle of $\theta 1$ is reflected from the optical reflection face 3A at a reflection angle $\theta 2$ to achieve reflection light c2.

At this time, in a case where a chip of 1 mm or more in size such as power LED or the like is used as the light emitting diode 2, the focal distance is short and both the incident angle θ1 and the reflection angle θ2 are large when the size of the dichroic mirror S1 is small. As a result, the light distribution characteristic is broad and thus the parallel light component is reduced. Particularly in the laminate type light emitting diode device 100, the parallel light component of each reflection type light emitting diode unit 10 is mainly emitted to the outside. Accordingly, when the parallel light component is reduced in each reflection type light emitting diode unit 10, the overall light output of the laminate type light emitting diode device 100 is reduced and thus the efficiency is lowered.

Therefore, in this embodiment, the size S1 of the optical reflection face 3A of the dichroic mirror 3 is set to be about forty times or more as large as the chip size (outside size) S of the light emitting diode 2 (that is, $S1/S \geq 40$), and thus the focal distance is set to a sufficiently large value. Accordingly, the incident angle θ1 and the reflection angle θ2 of the light c1 emitted from the end of the light emitting diode 2 are small, and light having a lot of parallel light component can be taken as the reflection light c2. Furthermore, in the case of the reflection type light emitting diode unit 10 which is configured to satisfy $S1/S \geq 40$, a light distribution characteristic having a half value angle of 2° or less can be obtained, and the light output efficiency of the laminate type light emitting diode device 100 can be enhanced.

Here, in this embodiment, the diffusion filter 9 is attached to the light emitting face 2A of the light emitting diode 2 as shown in FIG. 3. Specifically, the light emitting diode 2 is generally provided with an electrode (not shown) for wiring. Due to the effect of the electrode, unevenness of light emission of the light source occurs and the uniformity of the brightness distribution at the light emission time is lowered. Furthermore, when plural light emitting diodes 2 are densely mounted on the lead frame 1, the gap likewise occurs between the light emitting diodes, so that this gap induces unevenness of light emission and also induces reduction in uniformity of the brightness distribution.

Therefore, in this embodiment, in order to improve the uniformity of the brightness distribution, the diffusion filter 9 is provided to the light emitting face 2A of the light emitting diode 2, and after light-emission unevenness of light emitted from the light emitting diode 2 to the dichroic mirror 3 is improved, the light is reflected from the dichroic mirror 3.

According to this construction, the uniformity of light emitted from each reflection type light emitting diode unit 10 can be prevented from being reduced.

Furthermore, the reduction of the uniformity of the brightness distribution can be also prevented by providing the diffusion filter to the light emission face of each reflection type light emitting diode unit 10 or the light emission face of the laminate type light emitting diode device 100. However, in this construction, light reflected by the dichroic mirror 3 is diffused, so that the irradiation range spreads and the luminosity at the center thereof is reduced.

On the other hand, according to this embodiment, the light emitted from the light emitting diode 2 to the dichroic mirror 3 is diffused by the diffusion filter 9, so that the uniformity of the brightness distribution can be enhanced with suppressing the spreading of the irradiation range Next, the operation of this projector device 200 will be described. In the following description, it is assumed that sixty image frames are displayed every second by the projector device 200.

When an image of one frame is projected, the projector device 200 successively and time-divisionally projects R plane, G plane and B plane onto the screen 400 for the time of one frame (1/60 second), the R plane, the G plane and the B plane being achieved by decomposing the image into respective colors of R, G, B, whereby human beings visually recognize the respective images as a color composite image.

Specifically, as shown in FIG. 12, one frame is divided to three parts to provide a R turn-on period Tr, a G turn-on period Tg and a B turn-on period Tb. For the R turn-on period Tr, the light emission controller 141 supplies the reflection type light emitting diode unit 10A with a turn-on control signal Cm-r which has a predetermined voltage or is subjected to predetermined PWM control, thereby emitting red light. Likewise, green light and blue time are time-divisionally emitted for the G turn-on period Tg and the B turn-on period Tb, respectively. Accordingly, light beams of the respective colors of R, G, B are successively emitted the period of three times of one frame (1/180 second).

For the R turn-on period Tr, the two-dimensional optical modulator controller 142 outputs a modulation control signal Cm-d to the two-dimensional optical modulator 110 on the basis of the R plane indicating the R component of the image data to be projected, whereby the image based on only the R component is projected onto the screen for the R turn-on period Tr. Likewise, the image based on only the G component is projected for the G turn-on period Tg, and the image based on only the B component is projected for the B turn-on period Tb. As a result, the images of the respective color components of R, G, B are successively projected for the time of one frame, and human beings visually recognize the images of the respective color components as a color composite image.

When the brightness of the projected image is adjusted, the light emission controller 141 changes the voltages of or PWM control values (pulse width or the like) of the turn-on control signals Cm-r, Cm-g, Cm-b supplied to the respective reflection type light emitting diode units 10A to 10C, thereby controlling the light amount of the light emitted from each of the reflection type light emitting diodes 10A to 10C.

Here, this embodiment has as an image projection mode of the projector device 200 not only a mode in which the image is projected by only three colors of R, G, B, but also an intermediate color using mode in which an image is projected while an intermediate color achieved by suitably combining R, G, B is added to the three colors of R, G, B. In the following description, R and G are simultaneously turned on to display yellow color, however, light of other intermediate colors or white color may be displayed.

FIG. 13 is a timing chart showing the intermediate color using mode. As shown in FIG. 13, in the intermediate color using mode, an intermediate color light emission period Tc for displaying an intermediate color is newly added to one frame. In this intermediate color light emission period Tc, the light emission controller 141 simultaneously emits light of R and light of G and emits yellow light from the laminate type light emitting diode device 100. At this time, if the light emission intensities of R and B are set to be equal to that under monochromatic light emission, the intensity of the yellow light is higher than the other color light. Accordingly, the light emission controller 141 sets the voltage values or PWM control values of the turn-on control signals Cm-r and Cm-g to values smaller than those under the monochromatic light emission, whereby the light emission intensities of the intermediate color light and the monochromatic color light are set to the same level.

Furthermore, respective data of the R plane, the G plane, the B plane and the intermediate color plane achieved by decomposing an image to be displayed for one frame are input from the computer 300 to the control device 140, and for the intermediate color light emission period Tc, the two-dimensional optical modulator controller 142 controls the modulation of the two-dimensional optical modulator 110 on the basis of the intermediate color plane data.

Through the above control, the images of the respective color components of R, G, B and the intermediate color are successively projected for the time of one frame, thereby projecting an image having a broader color reproduction area as compared with the case where the image is projected by three colors of R, G, B.

By further adding a light emission period for displaying another intermediate color in one frame, plural intermediate colors can be projected and the color reproduction area can be more broadened.

As described above, this embodiment uses as a light source the laminate type light emitting diode device 100 having the reflection type light emitting diode unit 10A for emitting red light, the reflection type light emitting diode unit 10B for emitting green light and the reflection type light emitting diode unit 10C for emitting blue light which are joined to one another so as to emit light in the same direction. Therefore, when a light source is disposed in the projector device 200, the work of matching the optical axes of the reflection type light emitting diode units 10A to 10C with one another is not required. Furthermore, the reflection type light emitting diode units 10A to 10C are joined to one another to be unified into one body, and thus no dispersion occurs in the arrangement positions of the reflection type light emitting diode units 10A to 10C even when an impact is applied to the projector device 200.

Furthermore, according to this embodiment, each of the reflection type light emitting diode units 10A to 10C is provided with the joint member 4 for joining this reflection type light emitting diode unit to another reflection type light emitting diode unit 10 so that the optical axes thereof are coaxial with each other, and thus the optical axes of the reflection type light emitting diode units 10A to 10C can be simply and easily matched with one another when they are joined to one another to fabricate the laminate type light emitting diode device 100.

Still furthermore, according to this embodiment, at least two or more of the reflection type light emitting diode units 10A to 10C are simultaneously turned on to project an image of an intermediate color other than red, green and blue colors, so that a vibrant projection image having a broader color reproduction area can be achieved.

Still furthermore, according to this embodiment, the radiation performance of the light emitting diode 2 can be enhanced and the high output can be achieved. In addition, the electrical insulation between the reflection type light emitting diode units 10 can be enhanced. More specifically, in the conventional laminate type light emitting diode device in which the light emitting diodes are sealed in the sealing members formed of light transmissible material and plural reflection type light emitting diodes achieved by forming the reflection face on the surface of each sealing member which faces the light emitting face of each light emitting diode are continuously provided so as to be laminated in the light emission direction, the light emitting diode is sealed in the sealing member formed of light transmissible material, and thus there is the problem that the heat radiation of the light emitting diode is low and it is difficult to achieve a high output.

On the other hand, according to this embodiment, a plurality of reflection type light emitting diode units 10 each of which contains the light emitting diode 2 and the dichroic mirror 3 which are disposed in the metal hollow holder case 5 having high thermal conductivity are joined to one another through the joint members 4 formed of electrical insulating material, so that the heat radiation of the light emitting diode 2 can be enhanced and it is possible to achieve a high output.

In addition, the electrical insulation between the reflection type light emitting diode units 10 can be enhanced.

Furthermore, according to this embodiment, the light emitting diode 2 is fixed to the lead frame 1 formed of material having high thermal conductivity, and the lead frame 1 is fixed to the holder case 5. Therefore, heat generated from the light emitting diode 2 is transmitted to the holder case 5 through the lead frame 1, and heat is efficiently radiated from the holder case 5 concerned.

Particularly, according to this embodiment, the radiating fins 7 are formed on the outer surface of the holder case 5, so that the radiation performance can be further enhanced. If a fan for blowing cooling wind to the laminate type light emitting diode 100 is disposed in the projector device 200, the heat radiation performance can be further enhanced.

Furthermore, according to this embodiment, the focal distance adjusting spacer 8 for matching the focal position of the dichroic mirror 3 with the arrangement position of the light emitting diode 2 is provided between the lead frame 1 and the dichroic mirror 3. Therefore, even when the height of the chip is different among the light emitting diodes 2, the distance from the light emitting diode 2 (light emitting face 2A) to the optical reflection face 3A can be kept constant and the light distribution characteristic and the brightness distribution can be made uniform among the reflection type light emitting diode units 10.

Still furthermore, according to this embodiment, the diffusion filter 9 is provided between the light emitting diode 2 and the dichroic mirror 3. Therefore, the spreading of the irradiation range of light emitted from the reflection type light emitting diode unit 10 can be suppressed, and the uniformity of the brightness distribution can be enhanced.

Still furthermore, according to this embodiment, a mirror achieved by forming dielectric multilayered film having a predetermined number or more of layers on the surface of glass base material is used as the dichroic mirror 3, and thus the number of the layers of the dielectric multilayered film can be increased as compared with the prior art (for example, 30 layers or more). Accordingly, the dichroic mirror 3 having a sharp rising edge of passband is achieved, the light transmission loss can be suppressed, and the efficiency of the high output can be enhanced.

Still furthermore, according to this embodiment, the diameter S1 of the dichroic mirror 3 is set to 40 times or more of the size S of the outer shape of the light emitting diode 2, so that the incident angle $\theta 1$ and the reflection angle $\theta 2$ of the light c1 emitted from the edge of the light emitting diode 2 and incident to the dichroic mirror 3 can be reduced, so that light containing much parallel light component can be taken out as the reflection light c2.

still furthermore, according to this embodiment, the optical reflection face 3A of the dichroic mirror 3 is designed in an aspherical shape or paraboloidal shape whose focal point is coincident with the arrangement position of the light emitting diode 2. Therefore, the reflection light can be collimated and emitted from the holder case 5 to the outside with high efficiency.

Second Embodiment

In the first embodiment described above, the plural reflection type light emitting diodes 10A to 10C of the laminate type light emitting diode device 100 are individually or simultaneously turned on, and an image is projected by using the color light represented in the range shown in the xy chromaticity diagram of FIG. 14. On the other hand, according to this embodiment, a laminate type light emitting diode device 100A in which a light emitting diode unit 10D for emitting light different from R, G, B light (hereinafter referred to "another color light") is further joined to the reflection type light emitting diode units 10A to 10C is used as a light source to project an image.

That is, in the projector device 200A, an image is represented by using color represented in the composite range of four colors of the reflection type light emitting diode units 10A to 10D as shown in the xy chromaticity diagram of FIG. 16. Specifically, as shown in FIG. 17, four periods of the R light emitting period Tr for turning on red light, the G light emitting period Tg for turning on green light, the B light emitting period Tb for turning on blue light and another color light emitting period Tc for turning on another color light are provided within one frame, and the four reflection type light emitting diode units 10A to 10D are successively turned on every period.

As described above, according to this embodiment, the reflection type light emitting diode unit 10D for emitting color light other than red light, green light and blue light is further joined to the laminate type light emitting diode device 100, whereby image display of another color can be simply performed and the color reproduction area can be easily broadened.

Particularly, according to this embodiment, the laminate type light emitting diode device 100 is used as the light source, and thus the reflection type light emitting diode unit 10 serving as a light source of another color can be added more simply as compared with the conventional projector device in which the light sources are arranges around the cross dichroic prism to perform color composition.

Furthermore, in this embodiment, only one reflection type light emitting diode unit 10D for emitting light of difference color is added. However, the present invention is not limited to this style, and plural reflection type light emitting diode units 10 for emitting light beams of different colors may be joined to the reflection type light emitting diode units 10A to 10D, thereby constructing a laminate type light emitting diode device that can implement a broader color reproduction area.

Each of the embodiments described above is merely an embodiment, and these embodiments can be arbitrarily modified and applied within the scope of the present invention.

For example, in the above embodiments, inert gas may be filled in the holder case 5 to prevent deterioration of the light emitting diode 2, etc. due to corrosion or the like.

Furthermore, in the above embodiments, reflection film may be provided to the back surface of the dichroic mirror 3 so that light which is not reflected from the optical reflection face 3A of the front surface side and passes therethrough is reflected from the back surface concerned, whereby the efficiency of the light output can be further enhanced.

Furthermore, antireflection film for preventing reflection of light may be provided to the back surface of the dichroic mirror 3 so that light emitted from the reflection type light emitting diode unit 10 at the rear stage is passed through the back surface concerned with no loss, whereby the efficiency of the light output can be enhanced.

Still furthermore, in the above embodiments, the laminate type light emitting diode device 100 is constructed by joining three reflection type light emitting diode units 10. However, the present invention is not limited to this style, and the number of reflection type light emitting diode units 10 to be joined may be two or four or more.

Particularly, six reflection type light emitting diode units 10 may be joined to one another to emit light beams having different center wavelengths of blue light (wavelength of 470 nm), green light (wavelength of 525 nm), yellow green light (wavelength of 570 nm), yellow (wavelength of 590 nm), red yellow light (wavelength of 605 nm) and red light (wavelength of 660 nm), so that broader hue can be represented as compared with the case where the three light sources of blue, red, green are combined with one another.

The laminate type light emitting diode device 100 of this invention may be applied to a projector light source, a large-size full color display plate, a light source based on an optical fiber for industries, medical services, etc.

As shown in FIG. 18, a photodiode 20 may be secured to the lead frame 1 in place of the light emitting diode 2, thereby constructing a reflection type photodiode unit 30 in which only light beams in a specific wavelength area which are reflected from the dichroic mirror 3 can be detected (received) by the photodiode 20. Furthermore, a plurality of reflection type photodiode units 30 are joined to one another to thereby construct a laminate type photodiode device 500 in which light beams of different wavelengths are detected at the respective layers (stages).

For example, the laminate type light emitting diode device 100 may be set as an optical signal transmitter while the laminate type photodiode device 500 is set as an optical signal receiver, whereby a multiple optical communication device based on light beams of different wavelengths can be implemented.

BRIEF DESCRIPTION OF THE DRAWINGS

[FIG. 18] is a diagram showing an application example of the present invention.

Figure 1:
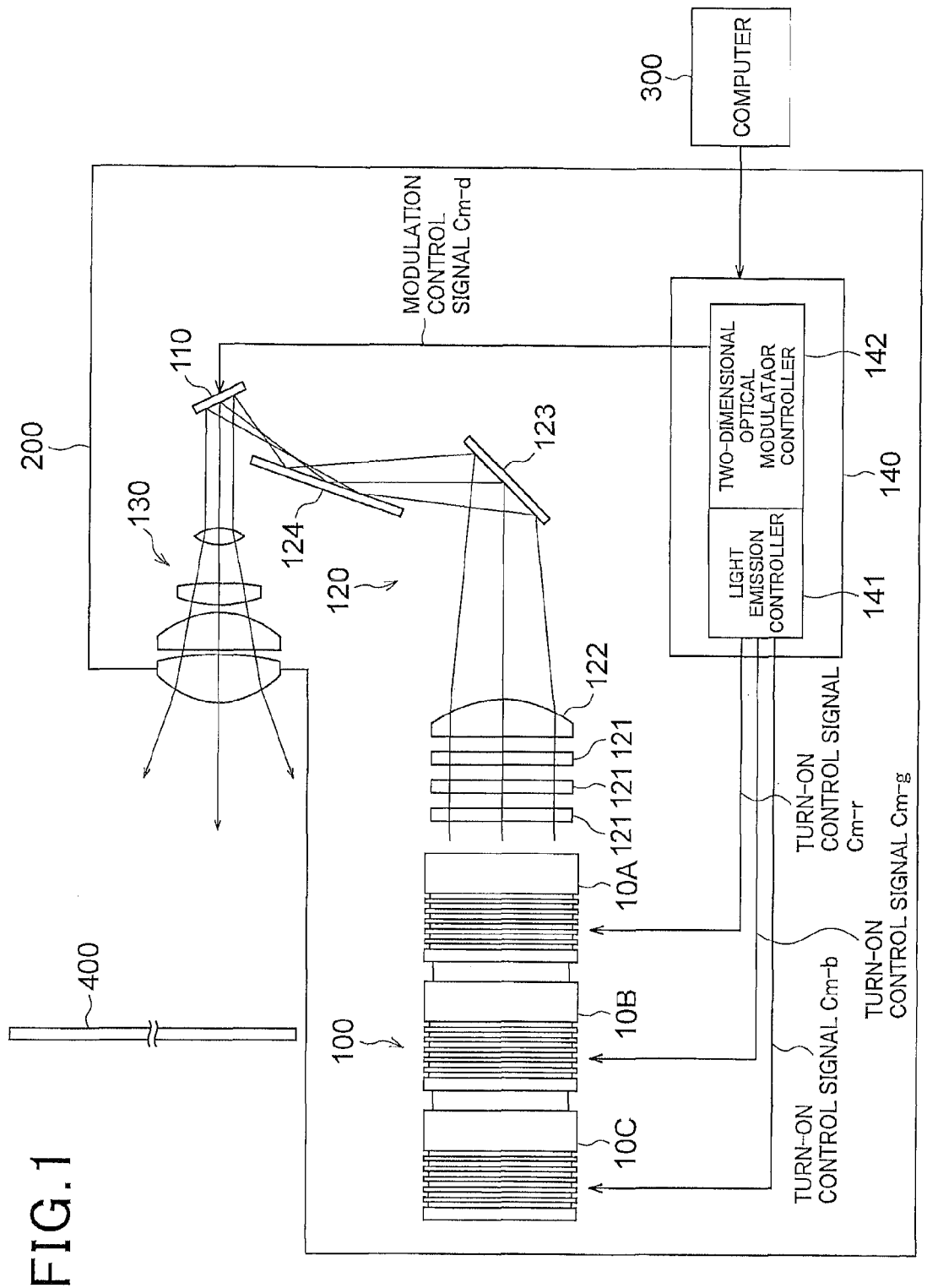
[FIG. 1] is a schematic diagram showing the construction of a projector device according to a first embodiment of the present invention.
Figure 2:
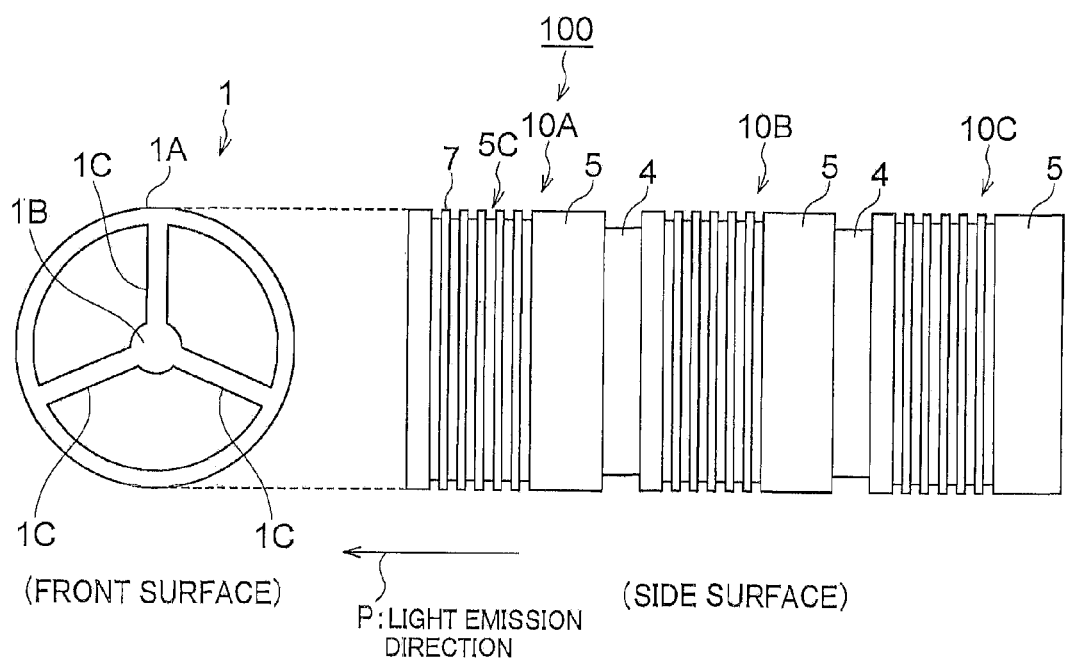
[FIG. 2] is a diagram showing the front and side surfaces of a laminate type light emitting diode device.
Figure 3:
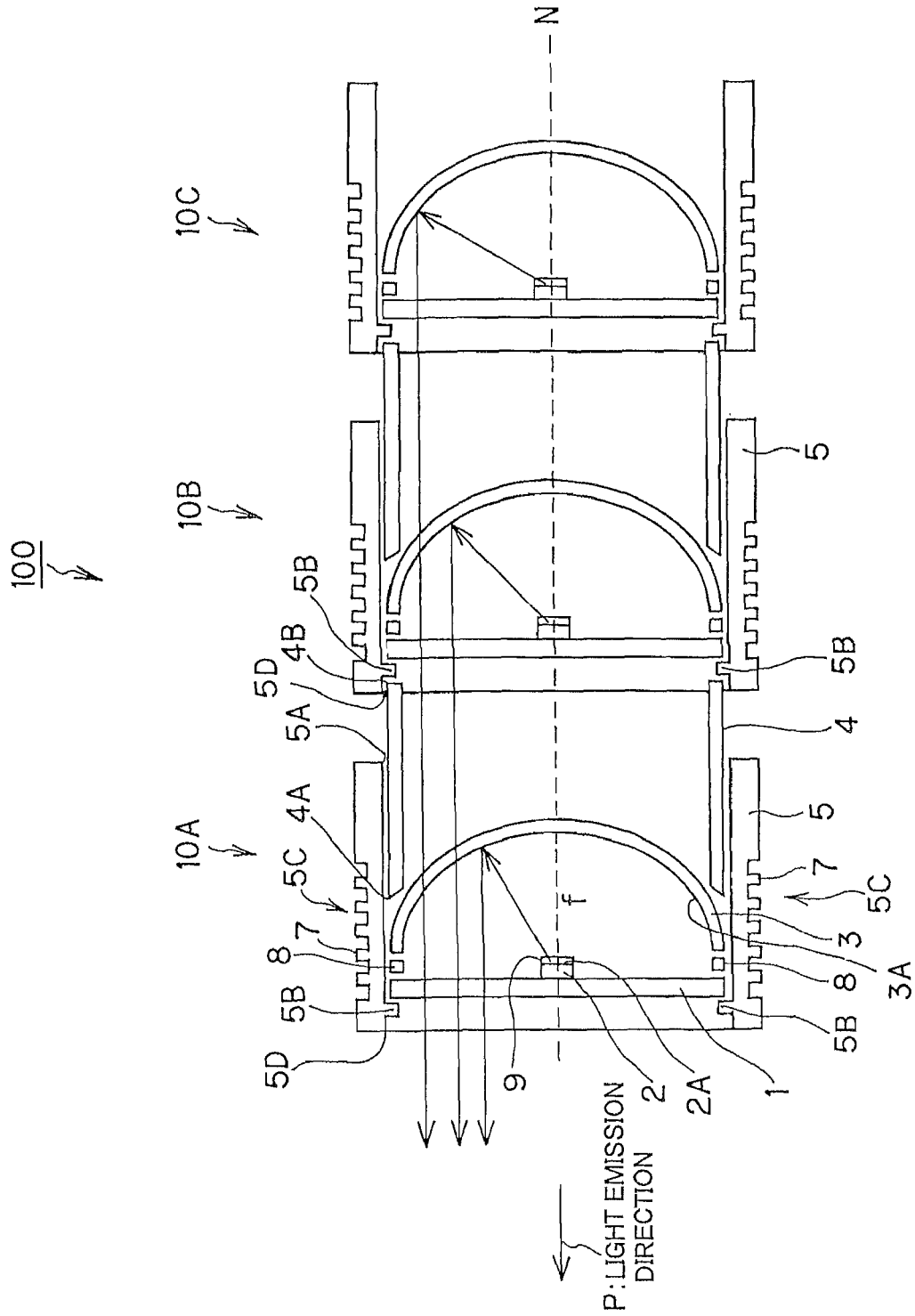
[FIG. 3] is a cross-sectional view of the laminate type light emitting diode device.
Figure 4:
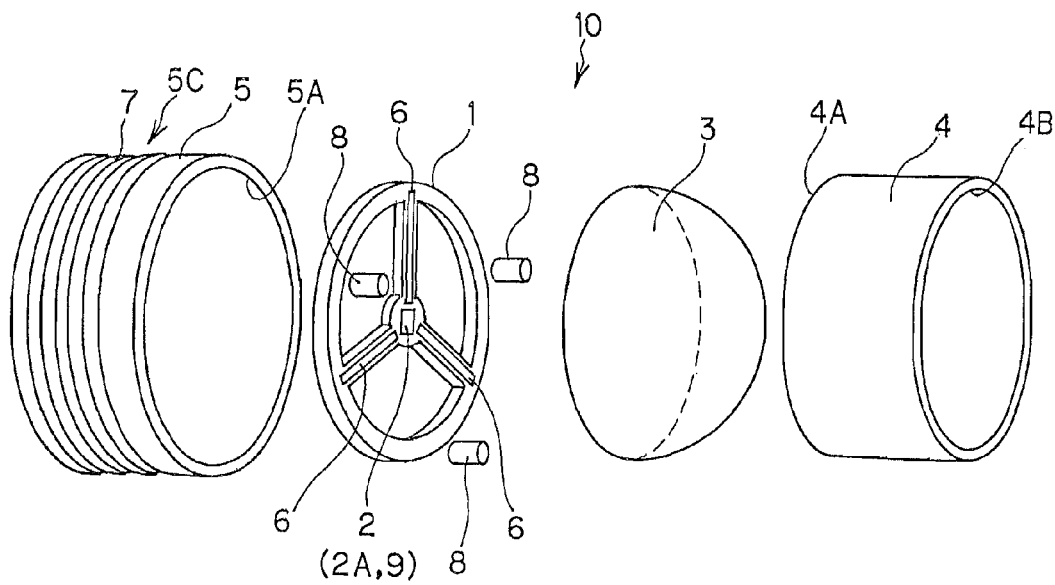
[FIG. 4] is an exploded perspective view showing a light emitting diode unit.
Figure 5:
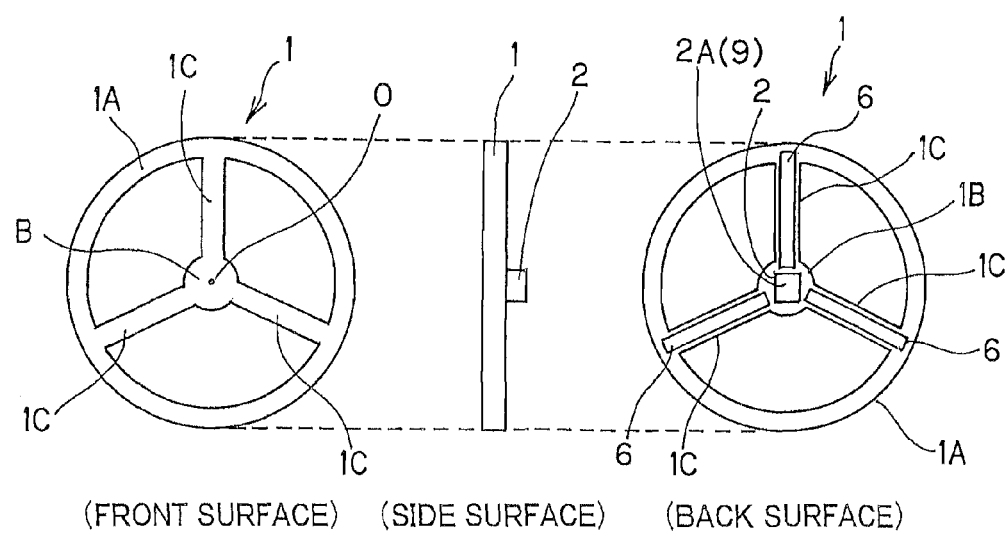
[FIG. 5] is a diagram showing front, side and back surfaces of a lead frame.
Figure 6:
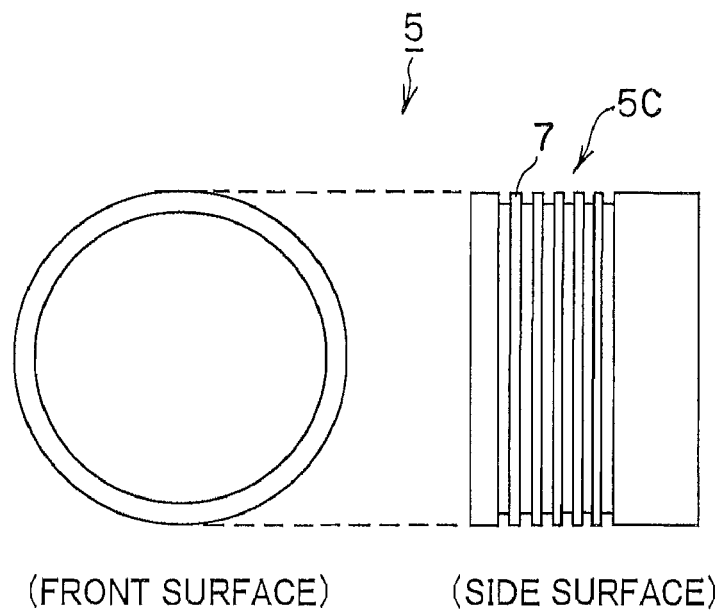
[FIG. 6] is a diagram showing front and side surfaces of a holder case.
Figure 7:
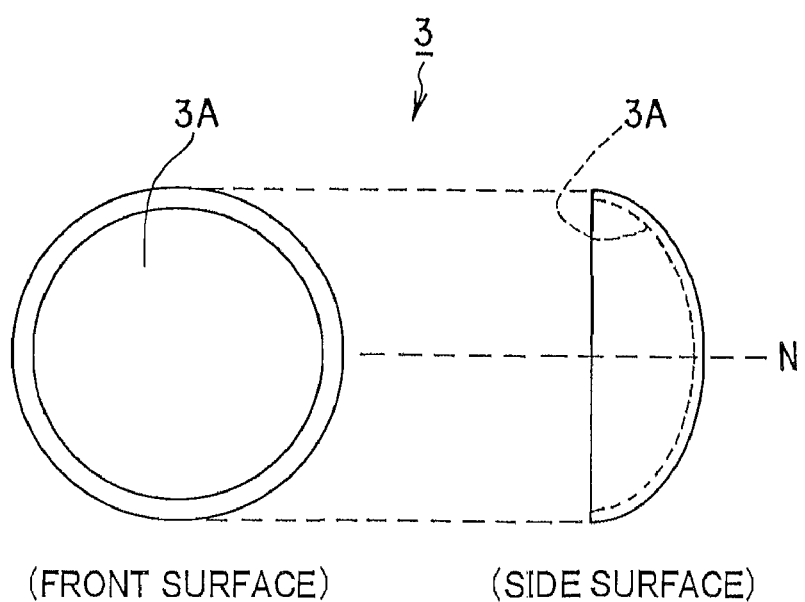
[FIG. 7] is a diagram showing front and side surfaces of a dichroic mirror.
Figure 8:
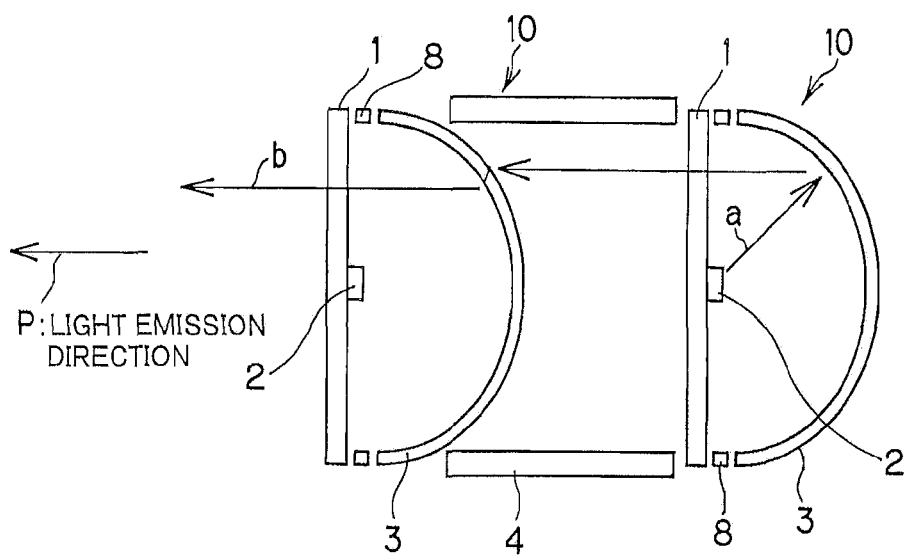
[FIG. 8] is a diagram showing an aspect of the optical path of light passing through a hollow joint member.
Figure 9:
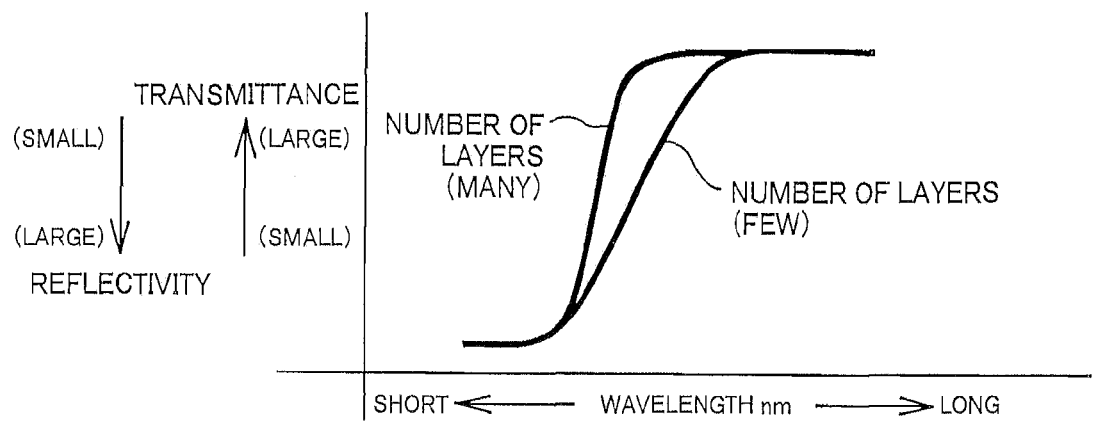
[FIG. 9] is a diagram showing the relationship between the number of layers of dielectric multilayered film of the dichroic mirror and an optical characteristic.
Figure 10:
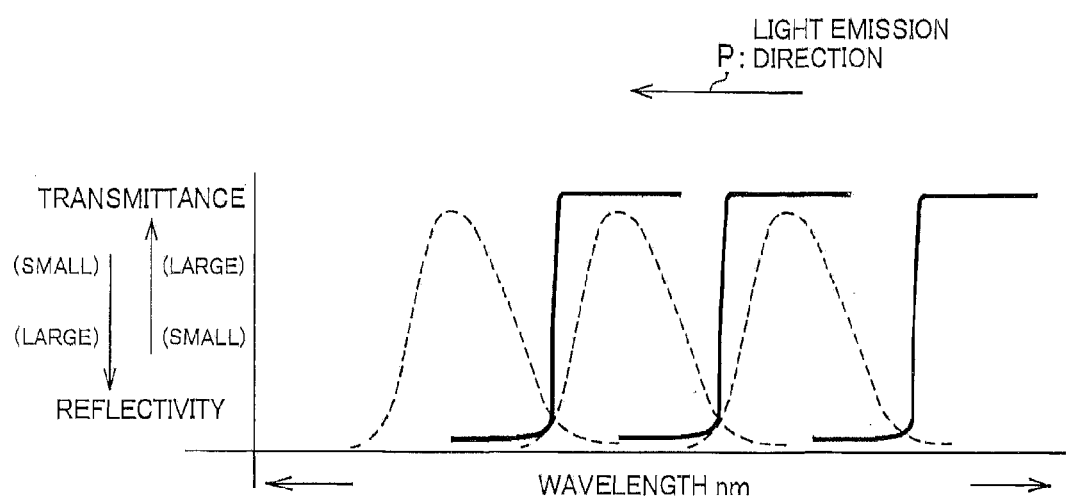
[FIG. 10] is a diagram showing the optical characteristic of each dichroic mirror of the light emitting diode unit.
Figure 11:
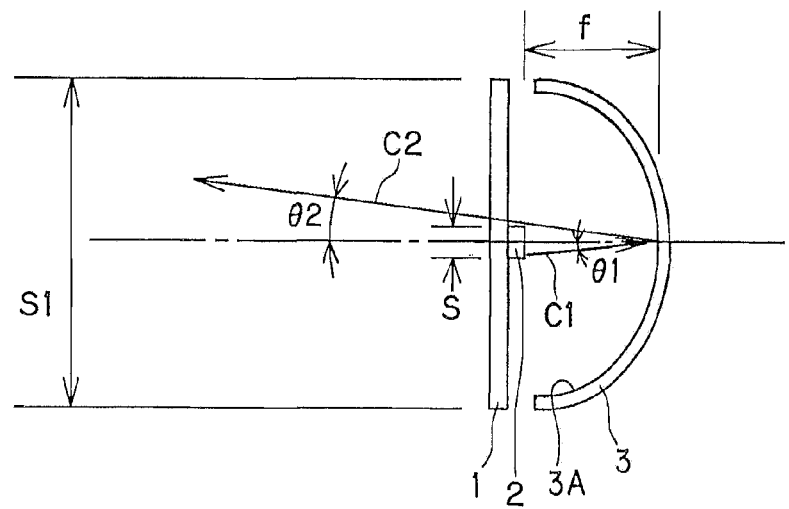
[FIG. 11] is a diagram showing the relationship in size between the light emitting diode and the dichroic mirror.
Figure 12:
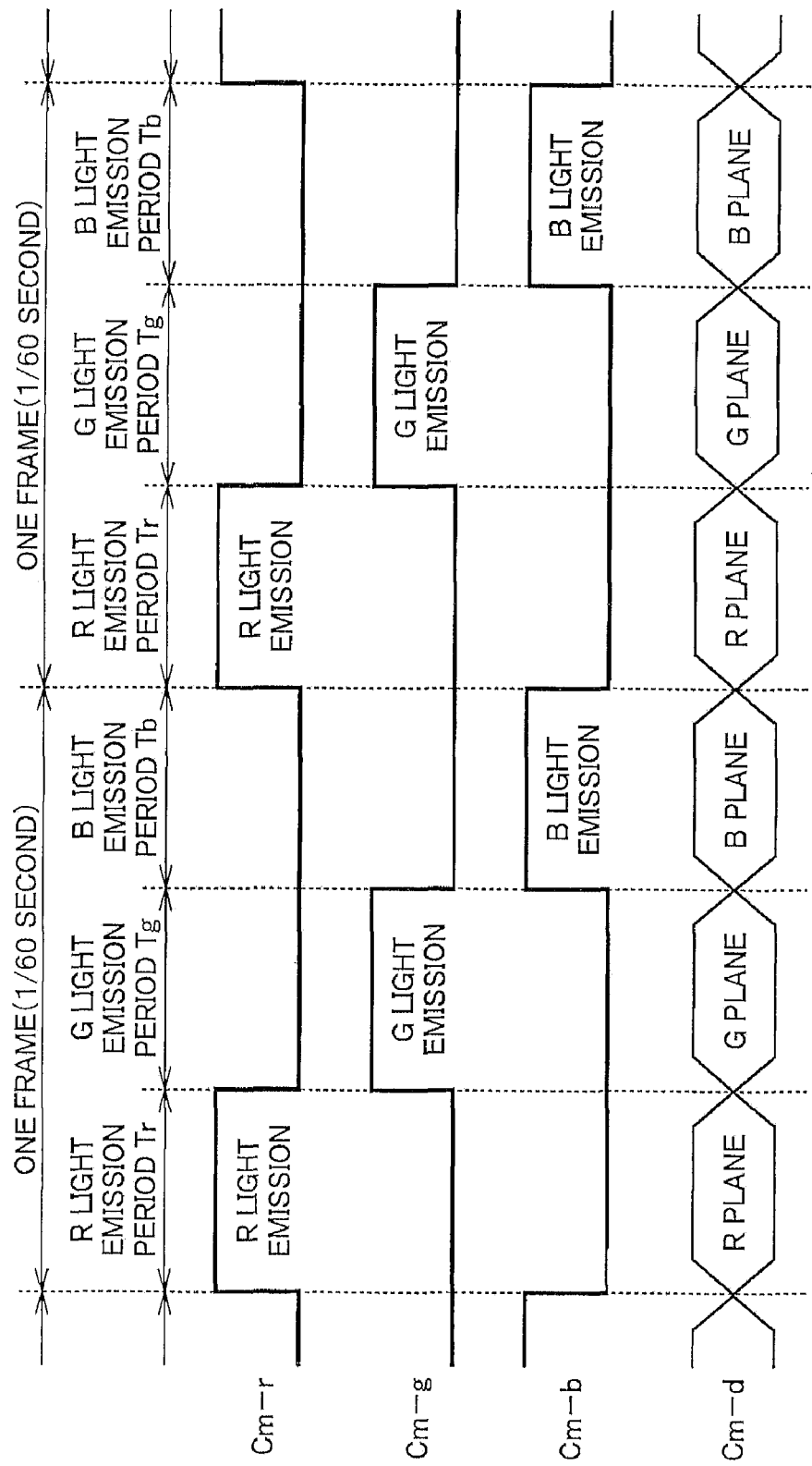
[FIG. 12] is a timing chart showing the projection operation of the projector device.
Figure 13:
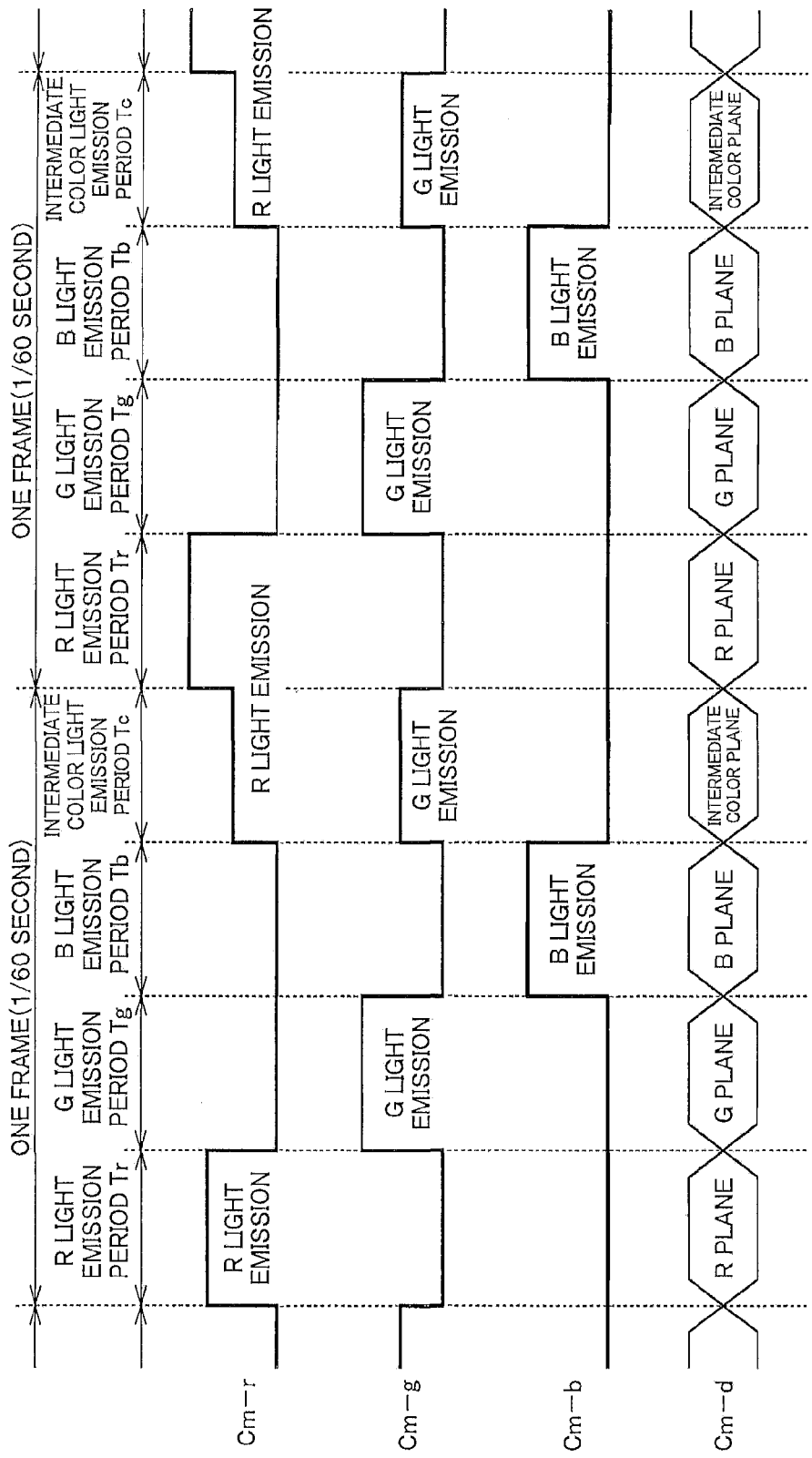
[FIG. 13] is a timing chart showing the projection operation an intermediate color using mode.
Figure 14:
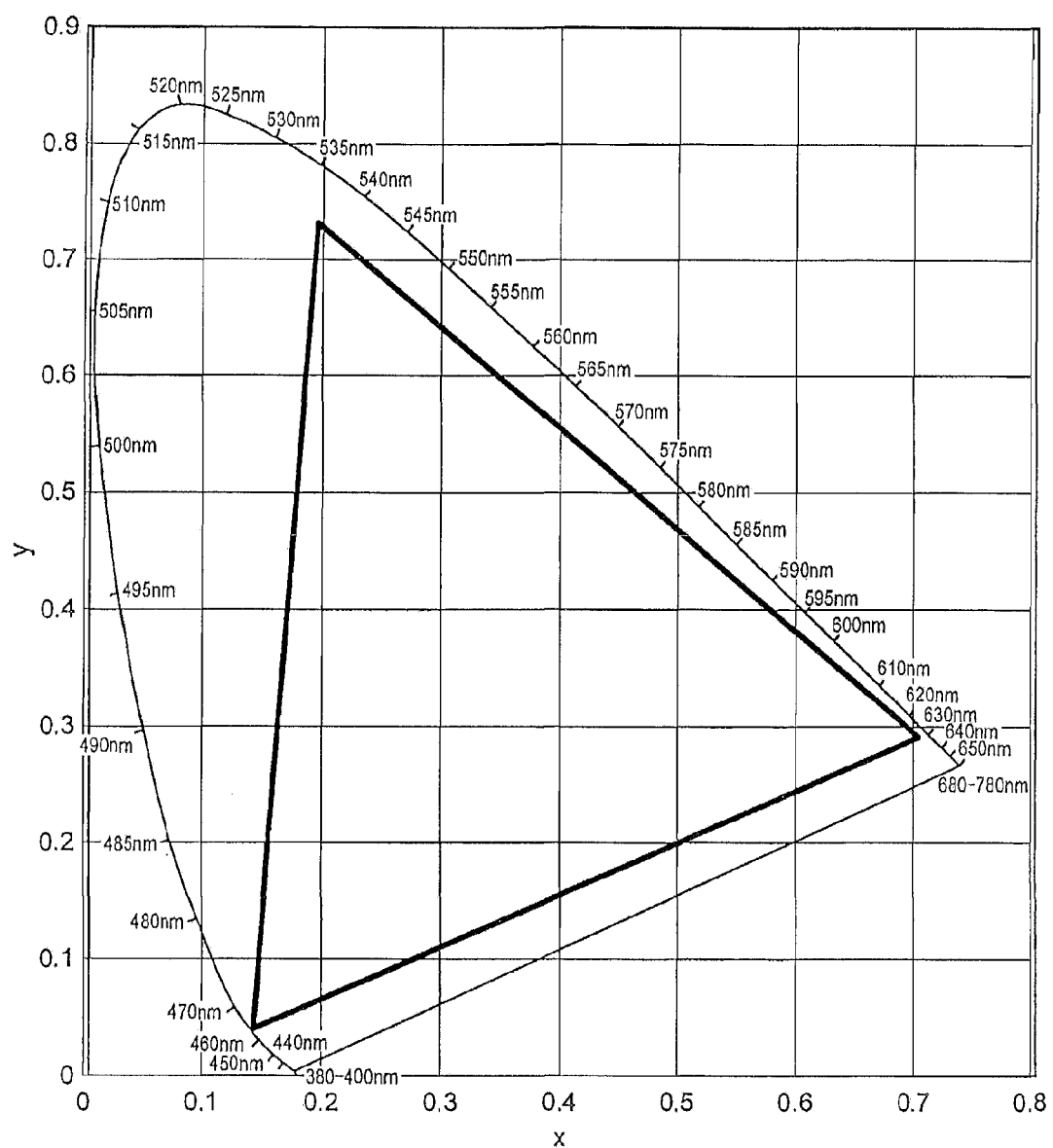
[FIG. 14] is an xy chromaticity diagram showing the range of colors which can be represented by the projector device according to the first embodiment.
Figure 15:
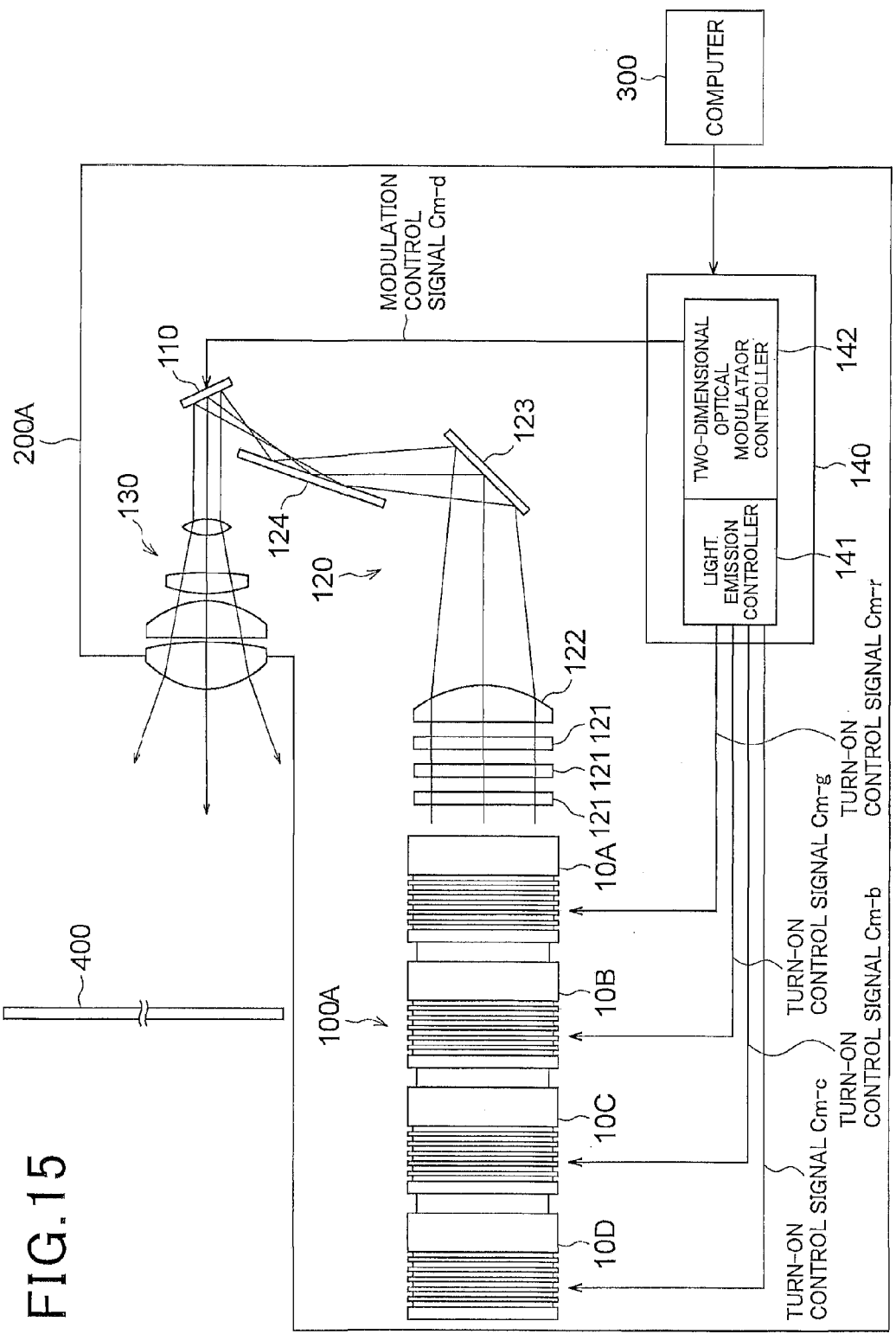
[FIG. 15] is a schematic diagram showing the construction of a projector device according to a second embodiment of the present invention.
Figure 16:
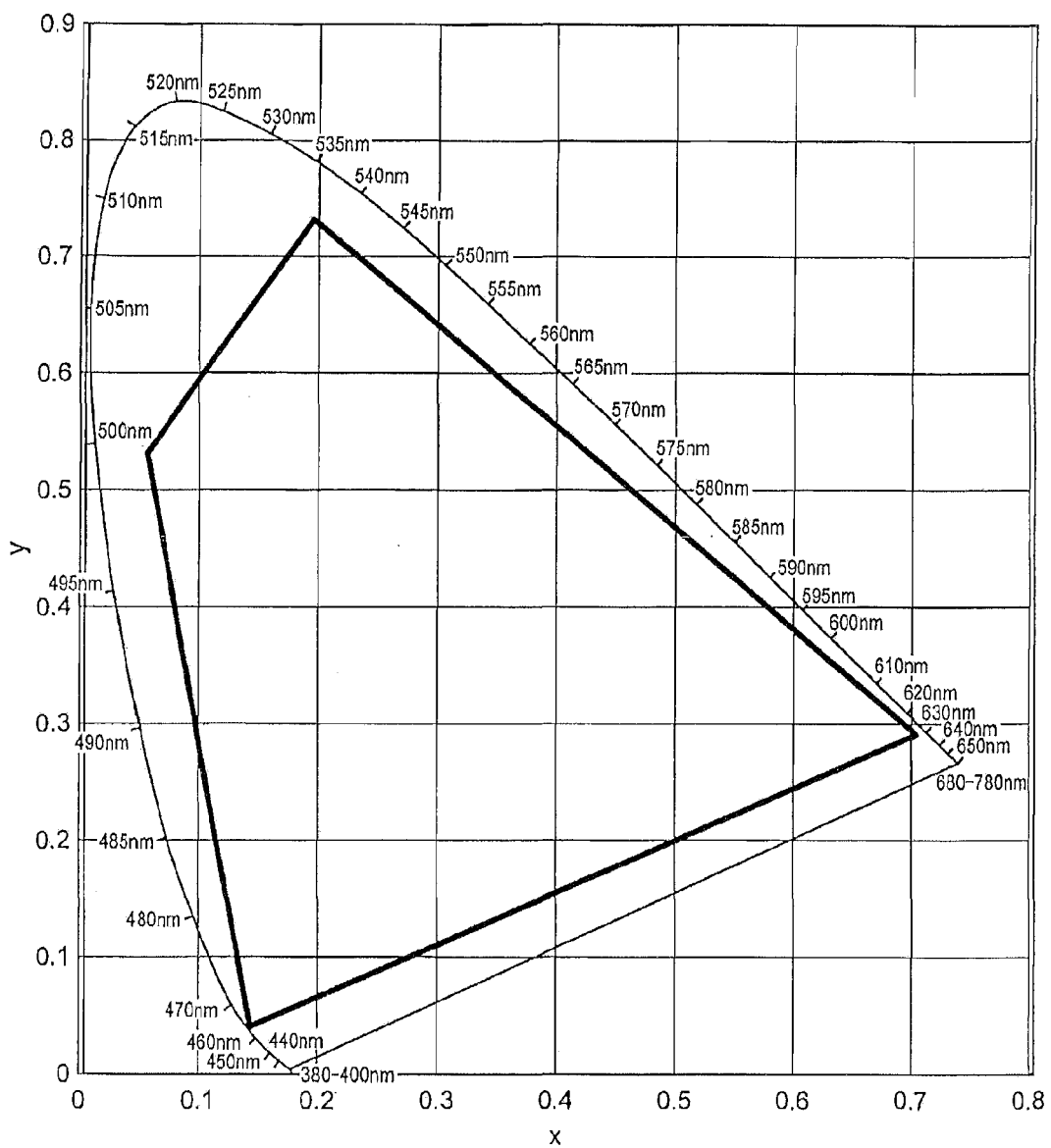
[FIG. 16] is an xy chromaticity diagram showing the range of colors which can be represented by the projector device according to the second embodiment of the present invention.
Figure 17:
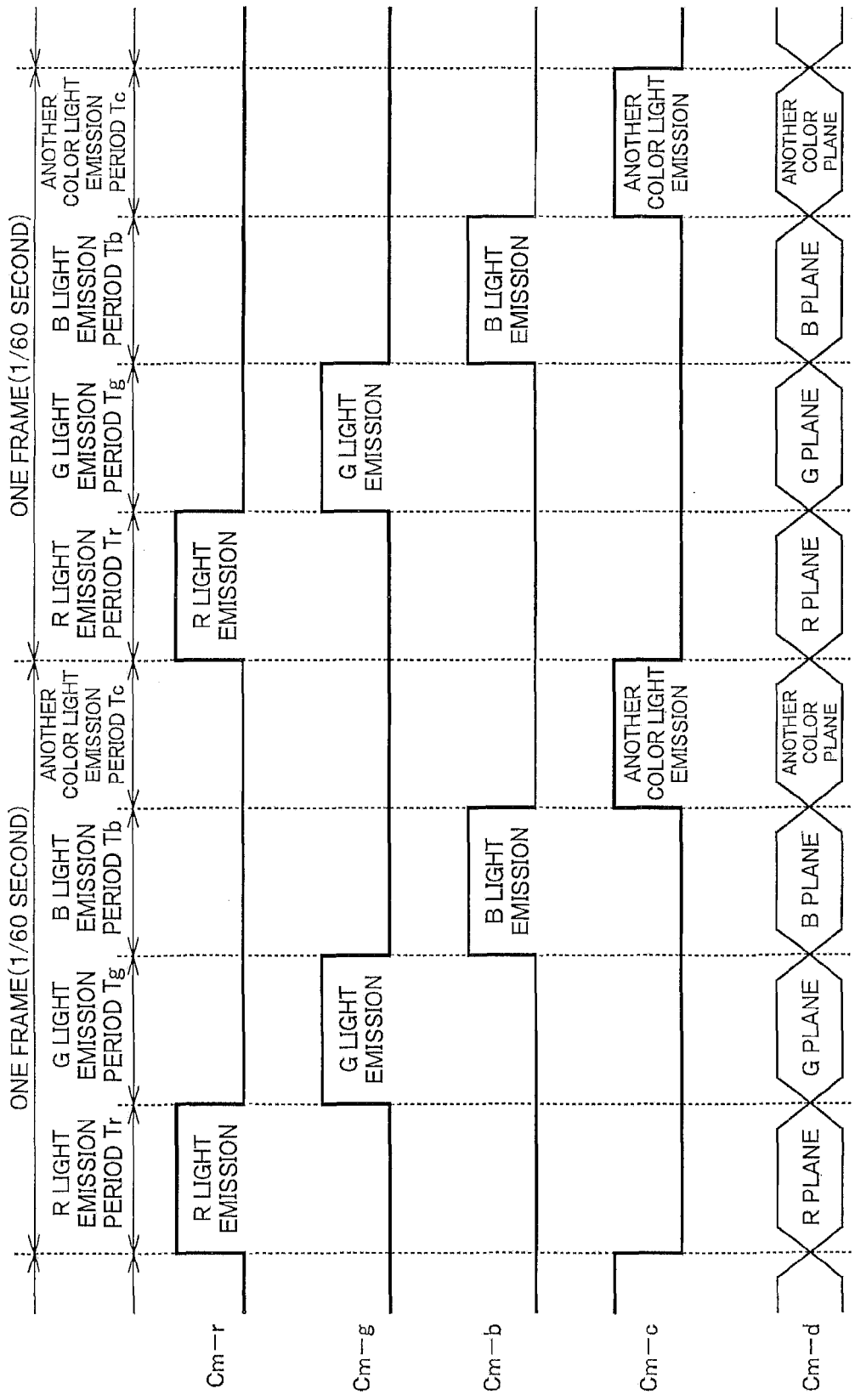
[FIG. 17] is a timing chart showing the projection operation of the projector device.

DESCRIPTION OF REFERENCE NUMERALS 1 lead frame
2 light emitting diode
2A light emitting face
3 dichroic mirror
3A light reflection face
4 joint member
5 holder case
7 radiating fin
8 focal distance adjusting spacer
9 diffusion filter
10, 10A to 10D reflection type light emitting diode unit
100, 100A laminate type light emitting diode device
110 two-dimensional optical modulator
130 projection optical system
140 control device
200, 200A projector device

The invention claimed is:

1. A laminate type light emitting diode device including a plurality of reflection type light emitting diode units, each unit comprising:
a light emitting diode,
a dichroic mirror,
a lead frame formed of high thermal conductive material to which the light emitting diode is secured,
a spacer interposed between the lead frame and the dichroic mirror for adjusting the distance between the light emitting diode and the dichroic mirror for matching the focal position of the dichroic mirror with the arrangement position of the light emitting diode,
a metal hollow holder case having high thermal conductivity in which the light emitting diode and the dichroic mirror are arranged so as to face each other, said spacer being separate from said holder case, and
a joint member formed of electric insulating material extending from within the holder case of one light emitting diode unit to within the holder case of another light emitting diode unit,
wherein the holder case of one reflection type light emitting diode unit is joined to the holder case of another reflection type light emitting diode unit of the plurality of reflection type light emitting diode units so that said reflection type light emitting diode units are stacked and unified into one body to form the laminate type light emitting diode device in which the light from each unit is coaxial and combined.

2. The laminate type light emitting diode device according to claim 1, wherein a diffusion filter is provided between the light emitting diode and the dichroic mirror.

3. The laminate type light emitting diode device according to claim 1, wherein a dielectric multilayered film having layers of a predetermined number or more is formed on the surface of a glass substrate to thereby form the dichroic mirror.

4. The laminate type light emitting diode device according to claim 1, wherein the diameter of the dichroic mirror is set to 40 times or more of the size of the outer shape of the light emitting diode.

5. The laminate type light emitting diode device according to claim 1, wherein a light reflecting face of the dichroic mirror is designed in an aspheric shape or paraboloidal shape whose focal point corresponds to the arrangement position of the light emitting diode.

6. The laminate type light emitting diode device according to claim 1, wherein each of the light emitting diodes of the plural reflection type light emitting diode units emits light having a different center wavelength.

7. The laminate type light emitting diode device according to claim 1, wherein a plurality of spacers are arranged between the lead frame and the dichroic mirror.

8. The laminate type light emitting diode device according to claim 1, wherein the spacer is made of resin.

9. The laminate type light emitting diode device according to claim 1, wherein the joint member of the light emitting diode unit is separate from the holder case and has a cylindrical shape, said joint member being interposed between the hollow holder case of the light emitting diode unit and the holder case of the other light emitting diode unit so that an outer peripheral surface of said joint member is fitted to inner surfaces formed by the two holder cases, which are joined to each other.

10. A laminate type light emitting diode device including a plurality of reflection type light emitting diode units, each unit comprising:
a light emitting diode,
a dichroic mirror,
a lead frame formed of high thermal conductive material to which the light emitting diode is secured,
a spacer interposed between the lead frame and the dichroic mirror for adjusting the distance between the light emitting diode and the dichroic mirror for matching the focal position of the dichroic mirror with the arrangement position of the light emitting diode,
a metal hollow holder case having high thermal conductivity in which the light emitting diode and the dichroic mirror are arranged so as to face each other, and
a joint member formed of electric insulating material by which the holder case of one reflection type light emitting diode unit is joined to the holder case of another reflection type light emitting diode unit of the plurality of reflection type light emitting diode units so that said reflection type light emitting diode units are stacked and unified into one body to form the laminate type light emitting diode device in which the light from unit is coaxial and combined,
wherein the lead frame has an annular portion, and a cylindrical member having substantially the same diameter as the annular portion of the lead frame is used as a spacer.

11. A reflection type light emitting diode unit comprising:
a light emitting diode;
a dichroic mirror;
a lead frame formed of high thermal conductive material to which the light emitting diode is secured;
a spacer interposed between the lead frame and the dichroic mirror for adjusting the distance from the light emitting diode to the dichroic mirror and for matching the focal position of the dichroic mirror with the arrangement position of the light emitting diode; and
a joint member formed of electric insulating material for allowing a metal hollow holder case of one reflection type light emitting unit to be joined to the holder case of another reflection type emitting diode unit, said joint member extending from within the holder case of one light emitting diode unit to within the holder case of another light emitting diode unit,
wherein the spacer is separate from the holder case, and the light emitting diode and the dichroic mirror are arranged so as to face each other in the holder case having high thermal conductivity and the light output coaxial with the focal direction of the dichroic mirror.

12. A reflection type light emitting diode unit according to claim 11, wherein the spacer is made of resin.

13. A reflection type light emitting diode unit according to claim 11, wherein the joint member of the light emitting diode unit is separate from the holder case and has a cylindrical shape, said joint member being interposed between the hollow holder case of the light emitting diode unit and the holder case of the other light emitting diode unit so that an outer peripheral surface of said joint member is fitted to inner surfaces formed by the two holder cases, which are joined to each other.

\* \* \* \* \*